United States Patent
Takase et al.

(10) Patent No.: US 7,120,160 B2
(45) Date of Patent: Oct. 10, 2006

(54) PACKET SWITCHING SYSTEM

(75) Inventors: Masayuki Takase, Kokubunji (JP); Hidehiro Toyoda, Musashino (JP); Norihiko Moriwaki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 10/042,351

(22) Filed: Jan. 11, 2002

(65) Prior Publication Data

US 2002/0154649 A1    Oct. 24, 2002

(30) Foreign Application Priority Data

Feb. 23, 2001    (JP) .............................. 2001-047548

(51) Int. Cl.
*H04L 12/56* (2006.01)
(52) U.S. Cl. .................. 370/415; 370/395.4; 370/428
(58) Field of Classification Search ............. 370/395.4, 370/415, 428
See application file for complete search history.

(56) References Cited

U.S. PATENT DOCUMENTS

| | | | | |
|---|---|---|---|---|
| 5,126,999 | A * | 6/1992 | Munter et al. ............... | 370/415 |
| 5,901,296 | A * | 5/1999 | Lackman et al. ............. | 710/113 |
| 6,570,873 | B1 * | 5/2003 | Isoyama et al. ............. | 370/375 |
| 6,717,945 | B1 * | 4/2004 | Jue et al. .................... | 370/392 |
| 6,720,968 | B1 * | 4/2004 | Butler et al. ................ | 345/535 |
| 6,848,017 | B1 * | 1/2005 | MacEachern et al. ....... | 710/317 |
| 6,879,561 | B1 * | 4/2005 | Zhang et al. ................ | 370/235 |
| 6,882,655 | B1 * | 4/2005 | Isoyama et al. ............ | 370/415 |
| 6,891,834 | B1 * | 5/2005 | Dally et al. ................ | 370/395.4 |
| 6,914,881 | B1 * | 7/2005 | Mansfield et al. .......... | 370/230 |
| 2002/0075803 | A1 * | 6/2002 | Zaharychuk et al. ........ | 370/231 |
| 2005/0058149 | A1 * | 3/2005 | Howe .......................... | 370/428 |

FOREIGN PATENT DOCUMENTS

JP    2000-78148    3/2000

OTHER PUBLICATIONS

"Improvement for Packet Priority of the Packet Switch with Multiple Input Queues for Every Output Port"; Takajyo; Technical Report of IEICE. SSE97-13,IN97-13(Apr. 1997); pp. 37-43.
"A Study on the Architecture of Large Scale Packet Switching System"; Wakayama; Technical Report of IEICE. SSE98-160,PS98-50(Dec. 1998); pp. 67-72.
"A Study of Input-buffer Switch Scheduling"; Sudo, Technical Report of IEICE. SSE99-118, PS99-42(Dec. 1999); pp. 43-48.
"Proposal and Performance Evaluation of a Queue Length Based Weighted Fair Queueing Algorithm"; Ohba; Technical Report of IEICE. SSE96-56(Aug. 1996); pp. 79-84.

* cited by examiner

*Primary Examiner*—Hassan Kizou
*Assistant Examiner*—Mohammad S. Adhami
(74) *Attorney, Agent, or Firm*—Mattingly, Stanger, Malur & Brundidge, P.C.

(57) ABSTRACT

A packet switching system arbitrates between Virtual Output Queues (VoQ) in plural input buffers, so as to grant the right of transmitting data to a crossbar switch to some of the VoQs by taking both an output data interval of a VoQ and the queue length of a VoQ as parameters. The system suppresses the delay time of the segment of a VoQ having a high load, thereby preventing buffers from overflowing; and, also, the system permits a VoQ having a low load to transmit segments under no influence of the VoQ that has a high load and is just reading out the segment.

4 Claims, 13 Drawing Sheets

FIG. 3

VoQ LEVEL ASSIGNMENT MATRIX

SEGMENT TRANSFER INTERVAL 71

THE NUMBER OF SEGMENTS IN VoQ 72

| | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 4 | 4 | 4 | 4 | 4 | 4 | 4 | 4 | 4 | 4 | 5 | 5 | 5 | 5 | 5 | 6 | 6 | 7 | 9 | 15 | 15 |
| 2 | 5 | 5 | 5 | 5 | 5 | 5 | 5 | 5 | 5 | 6 | 6 | 6 | 6 | 7 | 7 | 8 | 9 | 11 | 15 | 15 | 15 |
| 3 | 5 | 5 | 5 | 5 | 6 | 6 | 6 | 6 | 6 | 7 | 7 | 7 | 8 | 8 | 9 | 10 | 12 | 15 | 15 | 15 | 15 |
| 4 | 6 | 6 | 6 | 6 | 6 | 6 | 7 | 7 | 7 | 7 | 8 | 8 | 9 | 10 | 11 | 12 | 15 | 15 | 15 | 15 | 15 |
| 5 | 6 | 6 | 7 | 7 | 7 | 7 | 7 | 8 | 8 | 8 | 9 | 9 | 10 | 11 | 13 | 15 | 15 | 15 | 15 | 15 | 15 |
| 6 | 7 | 7 | 7 | 7 | 8 | 8 | 8 | 8 | 9 | 9 | 10 | 11 | 12 | 13 | 15 | 15 | 15 | 15 | 15 | 15 | 15 |
| 7 | 7 | 8 | 8 | 8 | 8 | 9 | 9 | 9 | 10 | 10 | 11 | 12 | 13 | 15 | 15 | 15 | 15 | 15 | 15 | 15 | 15 |
| 8 | 8 | 8 | 8 | 9 | 9 | 9 | 10 | 10 | 11 | 11 | 12 | 13 | 15 | 15 | 15 | 15 | 15 | 15 | 15 | 15 | 15 |
| 9 | 8 | 9 | 9 | 9 | 10 | 10 | 10 | 11 | 12 | 12 | 14 | 15 | 15 | 15 | 15 | 15 | 15 | 15 | 15 | 15 | 15 |
| 10 | 9 | 9 | 9 | 10 | 10 | 11 | 11 | 12 | 13 | 14 | 15 | 15 | 15 | 15 | 15 | 15 | 15 | 15 | 15 | 15 | 15 |
| 11 | 9 | 10 | 10 | 10 | 11 | 11 | 12 | 13 | 14 | 15 | 15 | 15 | 15 | 15 | 15 | 15 | 15 | 15 | 15 | 15 | 15 |
| 12 | 10 | 10 | 11 | 11 | 12 | 12 | 13 | 14 | 15 | 15 | 15 | 15 | 15 | 15 | 15 | 15 | 15 | 15 | 15 | 15 | 15 |
| 13 | 10 | 11 | 11 | 12 | 12 | 13 | 14 | 15 | 15 | 15 | 15 | 15 | 15 | 15 | 15 | 15 | 15 | 15 | 15 | 15 | 15 |
| 14 | 11 | 11 | 12 | 13 | 13 | 14 | 15 | 15 | 15 | 15 | 15 | 15 | 15 | 15 | 15 | 15 | 15 | 15 | 15 | 15 | 15 |
| 15 | 12 | 12 | 13 | 13 | 14 | 15 | 15 | 15 | 15 | 15 | 15 | 15 | 15 | 15 | 15 | 15 | 15 | 15 | 15 | 15 | 15 |
| 16 | 12 | 13 | 13 | 14 | 15 | 15 | 15 | 15 | 15 | 15 | 15 | 15 | 15 | 15 | 15 | 15 | 15 | 15 | 15 | 15 | 15 |
| 17 | 13 | 13 | 14 | 15 | 15 | 15 | 15 | 15 | 15 | 15 | 15 | 15 | 15 | 15 | 15 | 15 | 15 | 15 | 15 | 15 | 15 |
| 18 | 14 | 14 | 15 | 15 | 15 | 15 | 15 | 15 | 15 | 15 | 15 | 15 | 15 | 15 | 15 | 15 | 15 | 15 | 15 | 15 | 15 |
| 19 | 14 | 15 | 15 | 15 | 15 | 15 | 15 | 15 | 15 | 15 | 15 | 15 | 15 | 15 | 15 | 15 | 15 | 15 | 15 | 15 | 15 |
| 20 | 15 | 15 | 15 | 15 | 15 | 15 | 15 | 15 | 15 | 15 | 15 | 15 | 15 | 15 | 15 | 15 | 15 | 15 | 15 | 15 | 15 |

FIG. 4

VoQ LEVEL ASSIGNMENT MATRIX

SEGMENT TRANSFER INTERVAL

| | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 4 | 4 | 4 | 4 | 4 | 5 | 5 | 5 | 6 | 9 | 15 | 15 | 15 | 15 | 15 | 15 | 15 | 15 | 15 | 15 | 15 |
| 2 | 5 | 5 | 5 | 5 | 5 | 6 | 6 | 7 | 9 | 15 | 15 | 15 | 15 | 15 | 15 | 15 | 15 | 15 | 15 | 15 | 15 |
| 3 | 5 | 5 | 6 | 6 | 6 | 7 | 8 | 9 | 12 | 15 | 15 | 15 | 15 | 15 | 15 | 15 | 15 | 15 | 15 | 15 | 15 |
| 4 | 6 | 6 | 6 | 7 | 7 | 8 | 9 | 11 | 15 | 15 | 15 | 15 | 15 | 15 | 15 | 15 | 15 | 15 | 15 | 15 | 15 |
| 5 | 6 | 7 | 7 | 7 | 8 | 9 | 10 | 13 | 15 | 15 | 15 | 15 | 15 | 15 | 15 | 15 | 15 | 15 | 15 | 15 | 15 |
| 6 | 7 | 7 | 8 | 8 | 9 | 10 | 12 | 15 | 15 | 15 | 15 | 15 | 15 | 15 | 15 | 15 | 15 | 15 | 15 | 15 | 15 |
| 7 | 7 | 8 | 8 | 9 | 10 | 11 | 13 | 15 | 15 | 15 | 15 | 15 | 15 | 15 | 15 | 15 | 15 | 15 | 15 | 15 | 15 |
| 8 | 8 | 8 | 9 | 10 | 11 | 12 | 15 | 15 | 15 | 15 | 15 | 15 | 15 | 15 | 15 | 15 | 15 | 15 | 15 | 15 | 15 |
| 9 | 8 | 9 | 10 | 10 | 12 | 14 | 15 | 15 | 15 | 15 | 15 | 15 | 15 | 15 | 15 | 15 | 15 | 15 | 15 | 15 | 15 |
| 10 | 9 | 9 | 10 | 11 | 13 | 15 | 15 | 15 | 15 | 15 | 15 | 15 | 15 | 15 | 15 | 15 | 15 | 15 | 15 | 15 | 15 |
| 11 | 9 | 10 | 11 | 12 | 14 | 15 | 15 | 15 | 15 | 15 | 15 | 15 | 15 | 15 | 15 | 15 | 15 | 15 | 15 | 15 | 15 |
| 12 | 10 | 11 | 12 | 13 | 15 | 15 | 15 | 15 | 15 | 15 | 15 | 15 | 15 | 15 | 15 | 15 | 15 | 15 | 15 | 15 | 15 |
| 13 | 10 | 11 | 12 | 14 | 15 | 15 | 15 | 15 | 15 | 15 | 15 | 15 | 15 | 15 | 15 | 15 | 15 | 15 | 15 | 15 | 15 |
| 14 | 11 | 12 | 13 | 15 | 15 | 15 | 15 | 15 | 15 | 15 | 15 | 15 | 15 | 15 | 15 | 15 | 15 | 15 | 15 | 15 | 15 |
| 15 | 12 | 13 | 14 | 15 | 15 | 15 | 15 | 15 | 15 | 15 | 15 | 15 | 15 | 15 | 15 | 15 | 15 | 15 | 15 | 15 | 15 |
| 16 | 12 | 13 | 15 | 15 | 15 | 15 | 15 | 15 | 15 | 15 | 15 | 15 | 15 | 15 | 15 | 15 | 15 | 15 | 15 | 15 | 15 |
| 17 | 13 | 14 | 15 | 15 | 15 | 15 | 15 | 15 | 15 | 15 | 15 | 15 | 15 | 15 | 15 | 15 | 15 | 15 | 15 | 15 | 15 |
| 18 | 14 | 15 | 15 | 15 | 15 | 15 | 15 | 15 | 15 | 15 | 15 | 15 | 15 | 15 | 15 | 15 | 15 | 15 | 15 | 15 | 15 |
| 19 | 14 | 15 | 15 | 15 | 15 | 15 | 15 | 15 | 15 | 15 | 15 | 15 | 15 | 15 | 15 | 15 | 15 | 15 | 15 | 15 | 15 |
| 20 | 15 | 15 | 15 | 15 | 15 | 15 | 15 | 15 | 15 | 15 | 15 | 15 | 15 | 15 | 15 | 15 | 15 | 15 | 15 | 15 | 15 |

THE NUMBER OF SEGMENTS IN VoQ

FIG. 5

VoQ LEVEL ASSIGNMENT MATRIX

SEGMENT TRANSFER INTERVAL

|   | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|----|----|----|----|----|----|----|----|----|----|----|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 5 | 5 | 5 | 5 | 5 | 5 | 5 | 5 | 5 | 6 | 6 | 6 | 6 | 7 | 7 | 8 | 9 | 11 | 15 | 15 | 15 |
| 2 | 6 | 6 | 6 | 6 | 6 | 6 | 7 | 7 | 7 | 7 | 8 | 8 | 9 | 10 | 11 | 12 | 15 | 15 | 15 | 15 | 15 |
| 3 | 7 | 7 | 7 | 7 | 8 | 8 | 8 | 8 | 9 | 9 | 10 | 11 | 12 | 13 | 15 | 15 | 15 | 15 | 15 | 15 | 15 |
| 4 | 8 | 8 | 8 | 9 | 9 | 9 | 10 | 10 | 11 | 11 | 12 | 13 | 15 | 15 | 15 | 15 | 15 | 15 | 15 | 15 | 15 |
| 5 | 9 | 9 | 9 | 10 | 10 | 11 | 11 | 12 | 13 | 14 | 15 | 15 | 15 | 15 | 15 | 15 | 15 | 15 | 15 | 15 | 15 |
| 6 | 10 | 10 | 11 | 11 | 12 | 12 | 13 | 14 | 15 | 15 | 15 | 15 | 15 | 15 | 15 | 15 | 15 | 15 | 15 | 15 | 15 |
| 7 | 11 | 11 | 12 | 13 | 13 | 14 | 15 | 15 | 15 | 15 | 15 | 15 | 15 | 15 | 15 | 15 | 15 | 15 | 15 | 15 | 15 |
| 8 | 12 | 13 | 13 | 14 | 15 | 15 | 15 | 15 | 15 | 15 | 15 | 15 | 15 | 15 | 15 | 15 | 15 | 15 | 15 | 15 | 15 |
| 9 | 14 | 14 | 15 | 15 | 15 | 15 | 15 | 15 | 15 | 15 | 15 | 15 | 15 | 15 | 15 | 15 | 15 | 15 | 15 | 15 | 15 |
| 10 | 15 | 15 | 15 | 15 | 15 | 15 | 15 | 15 | 15 | 15 | 15 | 15 | 15 | 15 | 15 | 15 | 15 | 15 | 15 | 15 | 15 |
| 11 | 15 | 15 | 15 | 15 | 15 | 15 | 15 | 15 | 15 | 15 | 15 | 15 | 15 | 15 | 15 | 15 | 15 | 15 | 15 | 15 | 15 |
| 12 | 15 | 15 | 15 | 15 | 15 | 15 | 15 | 15 | 15 | 15 | 15 | 15 | 15 | 15 | 15 | 15 | 15 | 15 | 15 | 15 | 15 |
| 13 | 15 | 15 | 15 | 15 | 15 | 15 | 15 | 15 | 15 | 15 | 15 | 15 | 15 | 15 | 15 | 15 | 15 | 15 | 15 | 15 | 15 |
| 14 | 15 | 15 | 15 | 15 | 15 | 15 | 15 | 15 | 15 | 15 | 15 | 15 | 15 | 15 | 15 | 15 | 15 | 15 | 15 | 15 | 15 |
| 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| 16 | 15 | 15 | 15 | 15 | 15 | 15 | 15 | 15 | 15 | 15 | 15 | 15 | 15 | 15 | 15 | 15 | 15 | 15 | 15 | 15 | 15 |
| 17 | 15 | 15 | 15 | 15 | 15 | 15 | 15 | 15 | 15 | 15 | 15 | 15 | 15 | 15 | 15 | 15 | 15 | 15 | 15 | 15 | 15 |
| 18 | 15 | 15 | 15 | 15 | 15 | 15 | 15 | 15 | 15 | 15 | 15 | 15 | 15 | 15 | 15 | 15 | 15 | 15 | 15 | 15 | 15 |
| 19 | 15 | 15 | 15 | 15 | 15 | 15 | 15 | 15 | 15 | 15 | 15 | 15 | 15 | 15 | 15 | 15 | 15 | 15 | 15 | 15 | 15 |
| 20 | 15 | 15 | 15 | 15 | 15 | 15 | 15 | 15 | 15 | 15 | 15 | 15 | 15 | 15 | 15 | 15 | 15 | 15 | 15 | 15 | 15 |

THE NUMBER OF SEGMENTS IN VoQ

| INPUT LINE DIRECTION | OUTPUT LINE DIRECTION |
|---|---|
| WIN ALONE | WIN ALONE |
| WIN ALONE | WIN PLURALIZE |
| WIN PLURALIZE | WIN ALONE |
| WIN ALONE | DEFEAT |
| WIN PLURALIZE | DEFEAT |
| DEFEAT | WIN ALONE |
| DEFEAT | WIN PLURALIZE |
| DEFEAT | DEFEAT |

FIG. 10

LEVEL REASSIGNMENT TABLE 61

|  | WIN ALONE | WIN PLURALIZE | DEFEAT |
|---|---|---|---|
| WIN ALONE | LEVEL 3 | LEVEL 3 | LEVEL 1 |
| WIN PLURALIZE | LEVEL 3 | LEVEL 2 | LEVEL 1 |
| DEFEAT | LEVEL 1 | LEVEL 1 | LEVEL 0 |

PACKET SWITCHING SYSTEM

BACKGROUND OF THE INVENTION

The present invention relates to a packet switching system having an input buffer and an output buffer (referred to as an input/output buffer packet switching system, hereinafter), particularly to a packet switching system adopting an arbiter system.

A conventional input/output buffer packet switching system, which has a First-In First-Out (FIFO) memory for each input line, has a disadvantage in that, if plural packets inputted from plural input lines converge at a predetermined output path, "Head Of Line (HOL) blocking" is caused, in which there is only 58.6% throughput of data transfer. To avoid HOL blocking, there is provided a well known method in which a Virtual output Queue (VoQ) is provided for each output path at an input buffer.

The input/output buffer packet switching system associated with a crossbar switch, because a crossbar switch has no buffer, adopts a way to arbitrate between the VoQs of input buffers, so as to prevent data on the crossbar switch from being converged. The arbitration is performed for the purpose of selecting a combination of an input port and an output port to which the right of transmitting data (grant) to some of the VoQs is given. Accordingly, higher throughput of data transfer of the switching system depends on efficient arbitration.

There are two ways to effect arbitration for selecting a combination of an input port and an output port: one, where arbitration is performed using the unit of a fixed-length internal packet into which variable length packets inputted to the switch have been divided; and another, where, as indicated in USP Ser. No. 09/362,134, arbitration is performed using the unit of a fixed-length container into which plural variable length packets are packed. In this way, two units are used in the switching processing: one unit in the form of an internal packet having a small fixed length and another unit in the form of a container having a large fixed length.

As regards a unit used in the processing carried out in the switching system of the invention, the volume of data per arbitration is defined as one segment. Note that hereafter the term "segment" is also used as a generic term to indicate data to be treated inside the switch, data such as an internal packet, a packet, and a cell.

As conventional arbitration, the following three methods have been proposed:

First, there is a method of selecting a sending queue on a Round Robin basis by taking into consideration whether a segment of the VoQ exists as a parameter, as disclosed in "A Study of structuring a Large Capacity Packet Switching Systems," Koji WAKAYAMA, et al., SHINGAKUGIHOU SSE98-160, and also disclosed in JP-A-2000-78148;

Second, there is a method of selecting sending queues by taking the waiting time of the segment in the VoQ as a parameter, as disclosed in "A Study of Scheduling an Input Buffer Switch and Trial manufacture thereof," Toshiyuki SUDO, et al., SHINGAKUGIHOU SSE99-118; and Third, there is a method of selecting an output data queue by taking the length of the VoQ as a parameter, as disclosed in "A Proposal of Balanced Packet Scheduling Algorithm and Performance Evaluation," SHINGAKUGIHOU SSE96-56.

Each of the three methods has a problem that is caused when an unbalanced load is applied to the switch. Referring to FIG. 16, which is a conceptual view of an input port 30 of a 4×4 switch, an example of the problems will be explained. In the figure, reference numbers 31-1, 31-2, 31-3, and 31-4 denote VoQs, each being directed along its output path; a quadrangle in each VoQ represents a segment. The VoQ 31-1 has traffic which represents a higher load than the other queues; and the VoQ 31-4 has traffic H which represents a lower load than other queues.

In the first method of selecting a sending queue on a Round Robin basis by taking into consideration whether segment of a VoQ exists as a parameter, if unbalanced loads are applied to the switch, the Round Robin approach that equitably reads out segments from all VoQs permits the VoQ having a low load to transmit segments without regard to the VoQ that has a high load and is just reading out a segment. However, the queue of a VoQ having a high load is liable to be long, causing its delay time in segment transmission inside the switch to be longer than those of the other VoQs. As shown in FIG. 16, this brings about an overflow of segments at VoQ 31-1 having a high load, and might result in a segment 32A being abandoned.

In the second method of selecting sending queues by taking the waiting time of a segment in the VoQ as a parameter, in the same way as the first method, the queue of a VoQ having a high load is liable to be long This also causes the waiting time of the segment in a VoQ having a low load to be long, since the method that takes the waiting time of the segment in VoQ as a parameter transmits a segment having a long waiting time in a priority manner. In addition, management of the waiting time of all segments needs a lot of counters, so the method is not practicable.

Therefore, in most cases, the second method counts the waiting time from when the segment has arrived at the top of the queue. Specifically, it adds 1 to the counter of the VoQ when the segment in the VoQ is not transmitted during one arbitration, while it resets the counter when the segment is transmitted during one arbitration. This treats both a VoQ having a high load and a VoQ having a low load in the same way, because the counter resets once the segments of the VoQ which even has a high load are transmitted. Thus, the delay time of the VoQ to which a high load is given under the unbalanced load condition finally becomes large, and thus this might eliminate the overflow segments of the buffer.

In the third method of selecting sending queues by taking the length of the queue as a parameter, the segment can be effectively read out from a VoQ having a high load under above-said condition where an unbalanced load is applied to the switch. Thus, the delay time of the segment of a VoQ having a high load becomes small, also preventing a buffer from overflowing The method, however, suffers from a phenomenon called starvation, in which the grant of a transmission right is not given to a segment 32B of VoQ 31-4 that has a low load.

Accordingly, the method might result in a deterioration of the quality of data in the packets, especially in both packets of voice data, which are required never to be late in data transfer, and packets of important data, which are required never to be abandoned in data transfer, both for keeping good quality in data.

SUMMARY OF THE INVENTION

It is an object of the invention to provide a packet switching system that arbitrates between VoQs to select a combination of an input port and an output port, and thereby grant the right to transmit data to some of the VoQs by taking both an interval in sending a segment from a VoQ and the queue length of the VoQ as parameters.

According to one aspect of the invention we provide the packet switching system having: a queue length manager for managing the volume of segments queued in each VoQ per input line; an output data interval manager for managing an output data interval of the segment of each VoQ; and an arbiter-request (ARB-REQ) generator for allocating a level of transmission to the VoQs according to information received from the queue length manager and the output data interval manager, wherein arbitration is performed on the level assigned each VoQ so as to determine which VoQs will be allowed to send.

According to another aspect of the invention, we provide a packet switching system having: means for putting segment transfer interval prior to queue length in arbitration so as to determine a VoQ level; and means for putting queue length prior to segment transfer interval in arbitration so as to determine a VoQ level;

BRIEF DESCRIPTION OF THE DRAWINGS

FIG. 3 is a diagram showing one example of a level assignment matrix for assigning a level to a VoQ by the ARB-REQ generator of FIG. 13.

FIG. 4 is a diagram showing one example (prioritizing output data interval) of the level assignment matrix for assigning level to a VoQ by the ARB-REQ generator of FIG. 1.

FIG. 5 is a diagram showing one example (prioritizing queue length) the level assigning matrix for assigning the level to by the ARB-REQ generator of FIG. 1.

FIG. 9 is a table showing a combination of win and defeat results of the tournament for every input and every output in accordance with the present invention.

FIG. 10 is a level reassignment table according to the present invention.

DETAILED DESCRIPTION OF THE PREFERRED EMBODIMENTS

Figure 1:
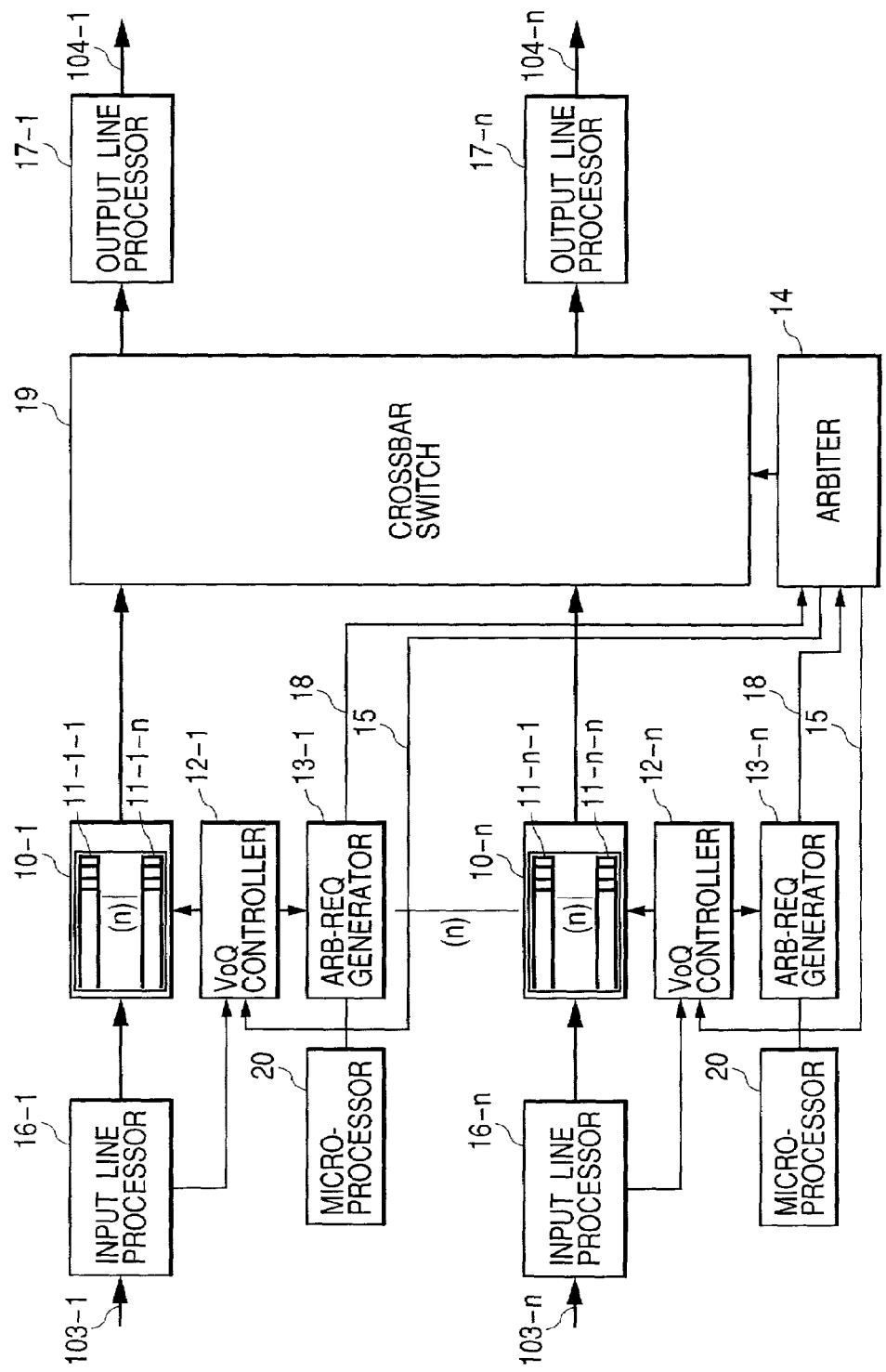
FIG. 1 is a block diagram showing one embodiment of a packet switching system of the present invention.

FIG. 1 illustrates one embodiment of a packet switching system of the present invention. In the system, ARB-REQ information is transmitted to an arbiter through a separate line 18, which is different from a data line for connecting a VoQ 11 and the Crossbar Switch 19.

An input line processor 16-$i$ ($i$=1 to n) extracts address information of a packet by analyzing a header of a packet which is input from an input line 103-$i$. An input buffer 10-$i$ includes n VoQ11-$i$ in correspondence to an output port. An input processor 16-$i$ gives address information which has been extracted to a VoQ controller 12-$i$. The VoQ controller 12-$i$ gives an indication to an input buffer 10-$i$ to write the packet in a VoQ corresponding to the output according to the address information. In this way, the packet is written in VoQ 11-$i$ which has been designated.

The VoQ controller 12-$i$ manages, per VoQ 11-$i$, information between the volume of queuing segments and a waiting time (that is to say, an output data interval of each segment) of the segment at the top of a queue buffer An ARB-REQ generator 13-$i$ assigns each level to each VoQ according to such information.

Each VoQ level is collected to an arbiter 14 by a signal line 18 during one arbitration period. It is determined by the arbiter 14 to which VoQ to give the grant according to the received information.

Grant information is transmitted to each of the VoQ controllers 12-$i$ ($i$=1, . . . , n) as ARB-ACK by a signal line 15, and, at the same time, the arbiter reflects the results of its arbitration to the structure of a path inside the crossbar switch. The VoQ controller 12-$i$ informs the input buffer 10 of which VoQ should send a segment according to its ARB-ACK information.

The segment transmitted from the input buffer 10-$i$ is switched by crossbar switch 19 and then transmitted to an output line processor 17-$i$. The output line processor 17-$i$ restructures the packet from the segment which has been received from the crossbar switch 19 and then sends it to an output line 104-$i$.

Figure 2:
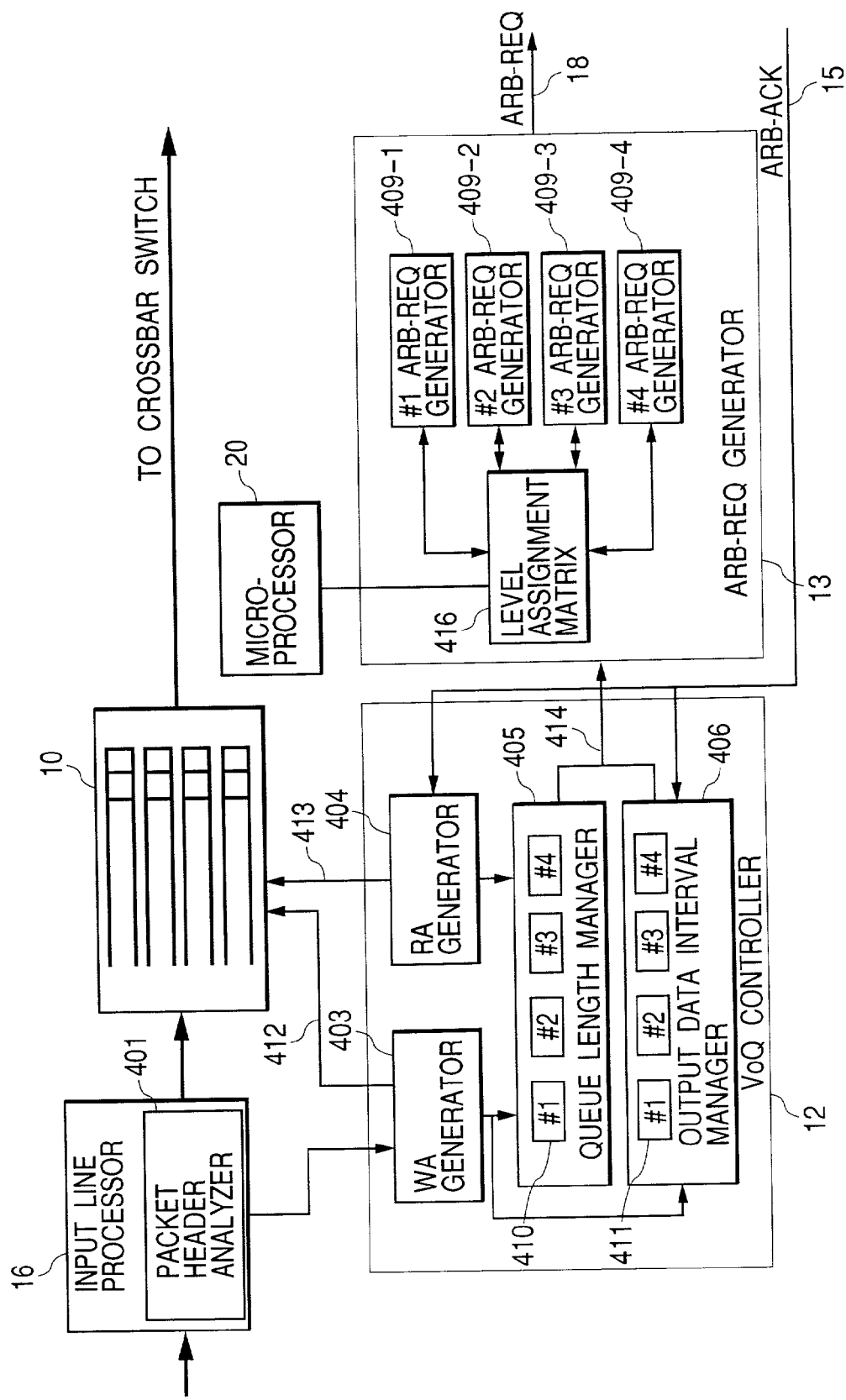
FIG. 2 is a block diagram of the structure of an ARB-REQ generator 13 and a VoQ controller 12 as used in the system of FIG. 1.

With reference to FIG. 2, the structures of the VoQ controller 12 and the ARB-REQ generator 13 will be described in detail. In this regard, FIG. 2 shows one example of a 4×4 switch for simple explanation.

The header of the packet, which has been processed in the header analyzer 401 inside the input processor 16, is transmitted to a write address (WA) generator 403 in the VoQ controller 12, and the WA generator 403 determines to which VoQ11 to write an input packet. The WA generator 403 sends memory address information to the input buffer 10 by way of a WA control signal line 412, and gives an indication of writing the packet to the VoQ 11 corresponding to a destination. At the same time, the WA generator 403 transmits information of the packet which has been written in the input buffer 10 to a queue length manager 405 and an output data interval manager 406. The queue length manager 405 has a queue length counter 410 corresponding to each of the VoQs inside the input buffer 10.

FIG. 2 illustrates the case of a 4×4 switch as an example. Since four VoQs exist in the input buffer 10, the queue length manager has four queue length counters 410. The queue length manager 405 increases the length of the segment of the input packet to the numeric value of the queue length counter 410 for the current length of the queue. The output data interval manager 406 has an output data interval counter 411 corresponding to each of one or more VoQs inside the input buffer 10. The output data interval manager 405 does nothing to the VoQ in which the packet has been input in the case where the segment has already existed. If the segment has not existed, the output data interval manager 406 gives an indication to the output data interval counter 411 corresponding to the VoQ so as to add 1 to the numeric value per arbitration period, and manages the output data interval time. In other words, the numerical value which the output data interval counter 411 shows indicates how long the segment has not been transmitted from corresponding VoQs.

A read address (RA) generator 404, according to ARB-ACK information transmitted from the signal line 15, transmits to the input buffer, through a signal line 413, information indicating from which VoQ the segment is to be sent. At the same time, the read address (BA) generator 404 transmits information of the segment which is read out from the input buffer 10 to the queue length manager 405 and the output data interval manager 406 as well. The queue length manager 405 decreases the queue length counter 410 corresponding to the VoQ which has transmitted out a segment to the crossbar switch 19. Further, the output data interval manager 406 resets the value of the output data interval counter 411 corresponding to that VoQ.

Information of the queue length manager 405 and of the output data interval manager 406 is transmitted to the ARB-REQ generator 13 by way of a signal line 414. The ARB-REQ generator 13 has an ARB-REQ generating part 409 corresponding to each queue inside the input buffer 10. Respective ARB-REQ generating parts 409-1 to 409-4 assign some level to the corresponding queue according to information received from the ARB-REQ generator 13. When the level is assigned to the queue, a VoQ level assignment matrix 416 is referred to. For the VoQ level assignment matrix 416, it is possible for a user to tune the arbiter in accordance with the characteristics of the traffics which are input to the node thereof. The level of each VoQ which has been created in the ARB-REQ generator is transmitted to the arbiter 14 by way of the signal line 18.

FIG. 3 shows one embodiment of the VoQ level assignment matrix 416. The level assignment matrix has a segment transfer interval 71 along the horizontal axis and the number of segments queued in VoQ along the vertical axis 72. The longer an output data interval time is and the more the number of segments queued in the VoQ is, the bigger the level assigned to the VoQ is. The level assignment matrix is calculated from a queue length (the number of segment in VoQ) and the segment transfer interval.

By assigning the level to the queue in this way, it is possible to send, within an arbitrarily set delay time, the packet which has entered into the switch.

The time for sending the packet from the queue of a VoQ having a high load is longer than that of a VoQ having a low load Thus, a high level is assigned to a VoQ in which the number of segments stored in the queue is big, whereby transmission grant is given thereto in a priority manner. In other words, this level indicates information of the degree of priority in obtaining grant.

Since the packet is transmitted within a delay time which is set arbitrarily by way of a VoQ having a low load, it functions to increase the VoQ level if the transmitting interval becomes long.

The VoQ level L is obtained from the following expression.

$$L = \frac{1}{\ln\left(\frac{M - a \cdot t}{b \cdot s} \times e\right)} \times 15$$

where, M: time out, t: output segment interval, s: the number of segments at the present time, a: output data coefficient, b: queue length coefficient.

When $(M-at)/b \cdot s \leq 1$ is attained, the VoQ level attains the maximum value. When the VoQ level has reached the maximum value, it is indicated that the VoQ thereof has reached a condition having a high possibility of obtaining a grant.

M is a value which is defined from both a delay time that can arbitrarily be set by the switch and one arbitration time. M is also a value for deciding both the maximum value of segment transfer interval 71 in the level assignment matrix and the maximum value of the number of segments 72 queued in a VoQ. Where T is the delay time which is required by the switch and is determined arbitrarily, ta is a time for one arbitration time, n is the number of input ports of the switch. M can be obtained by the following expression.

$$M = \frac{T}{t_a} - n$$

T/ta can define the number of times arbitration is performed during the delay time T, which can be defined arbitrarily. On the assumption that the levels of all VoQs attain the maximum values at the same time, until the grant is given, a VoQ, to which the time for maximum n arbitration will be waited, appears. Therefore, in order to transmit the segment within the delay time which is arbitrarily defined, even if a VoQ has only one segment, a VOQ level takes the maximum value, when the output data interval becomes T/ta−n.

As apparent from the level assignment matrix shown in FIG. 3, since the VoQ level becomes high as the output data interval becomes large in a VoQ having only one segment, it is not necessarily concluded that the segments are not transmitted until the maximum delay time is requested.

The level assignment matrix in FIG. 3 is limited to time out M=20, a=1, and b=1. By changing an output data interval coefficient a and a queue length coefficient b, it is possible for them to be changed to arbitration which regards the output data interval as important and arbitration which regards the queue length as important.

When the packet switching system of the present invention is employed in a place where, for example, a lot of voice data is processed which is required never to be late in data transfer, the setting is changed so as to suppress the delay time as much as possible where such data are queued in a VoQ having low load traffic.

More specifically, setting the value of the output data interval coefficient a to 1 or more permits the VoQ in which the segments are not yet filled to get a large level within a short output data interval. FIG. 4 shows the condition of the VoQ level assignment matrix at the time of defining the value of the output data interval coefficient a as 2. When the level of the matrix in FIG. 4 is compared with the level assignment matrixof FIG. 3, the VoQ level already becomes large when the output data interval of the segment is small.

Thus, it is also possible for a VoQ having a low load to transmit the segment in a short delay time.

On the contrary, when the packet switching system of the present invention is employed in a place where a lot of data is processed which is required never to be abandoned in data transfer, though the delay time of the VoQ having a low load traffic lengthens slightly, it is preferable to suppress an overflow of a buffer by outputting the segments from a VoQ having high load traffic in a priority manner. In such a case, by defining the value of the queue length coefficient b as a value greater than 1, it is permitted to assign the VoQ level which acts in response sensitively to a change of the length of the queue. When a high load is applied, the length of the queue becomes long. FIG. 5 exemplifies the condition of the level assignment matrix at the time of assigning the queue length coefficient as 2. When the level assignment matrix is compared with the level assignment matrix of FIG. 3, large levels are found in places in which the number of the segments of VoQ is small. Therefore, for VoQ in which the length of the queue becomes longer, it is possible to prevent a VoQ, in which the length of the queue becomes longer, from buffer overflowing by making it easy to give a grant by assigning a larger level as soon as possible.

Further, where the output data interval is not considered at all and it is desired that arbitration is performed using only the length of the queue, it becomes possible by defining the value of the output data interval coefficient a as 0.

All of the VoQ levels calculated by a numeric expression 1 are rounded off and they are expressed in the level assignment matrix as integers. Further, when $M-a \cdot t < b \cdot s$ or $M \leq a \cdot t$ is attained, they become values other than $0 < L \leq 15$. However, when such a situation occurs, since it is expressed that the VoQ level already exceeds the maximum level 15, the level 15 is given to a V0Q to which the values other than $0 < L \leq 15$ are given by this expression.

Information of the level per VoQ is collected to arbiter 14 from each ARB-REQ generator.

Figure 6:
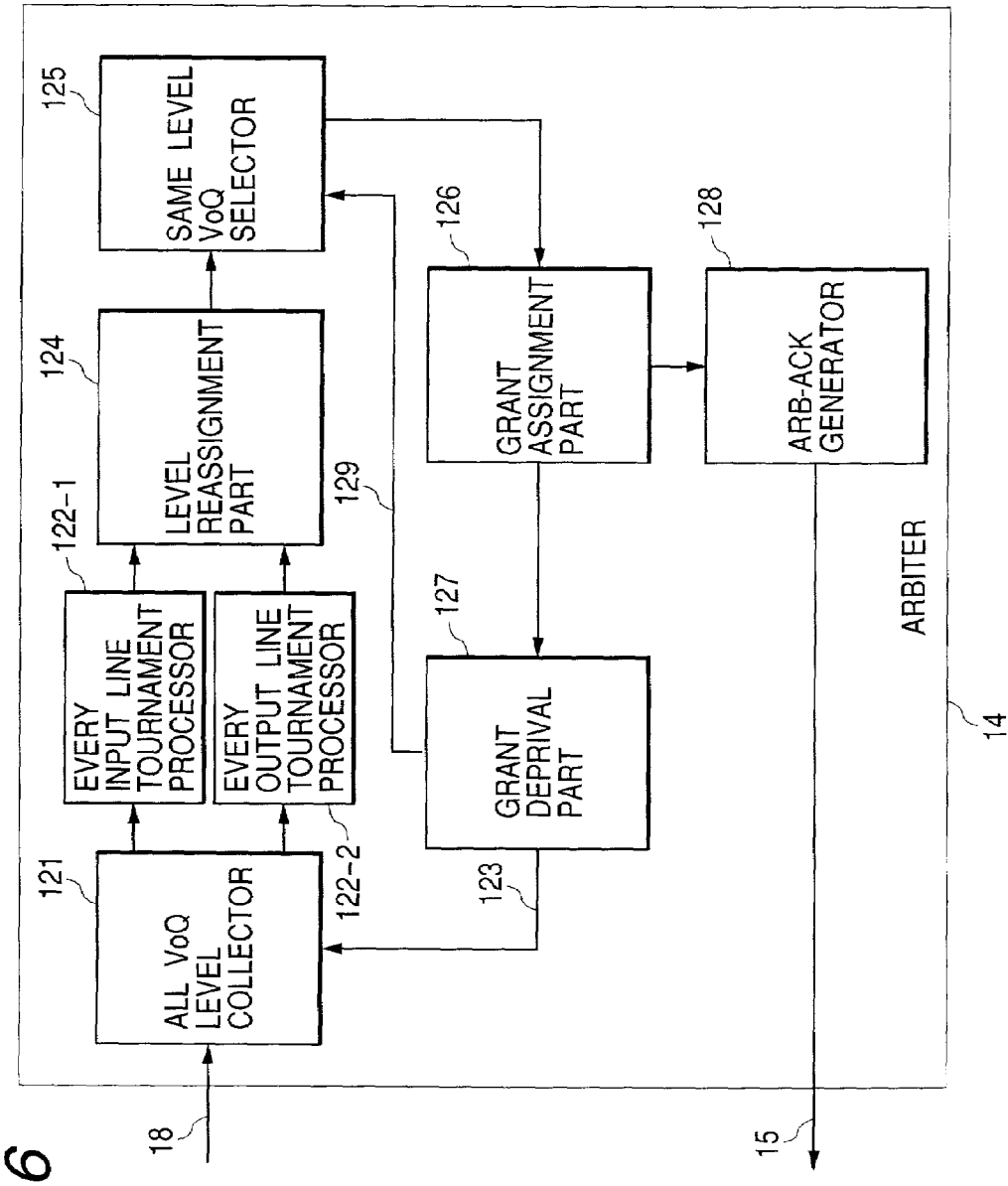
FIG. 6 is a block diagram of an example of the structure of an arbiter 14 as used in the system of FIG. 1.

FIG. 6 is a block diagram of an embodiment of the arbiter 14. In all VoQ level collectors 121, information of the level of all VoQs is collected.

Figures 7, 8:
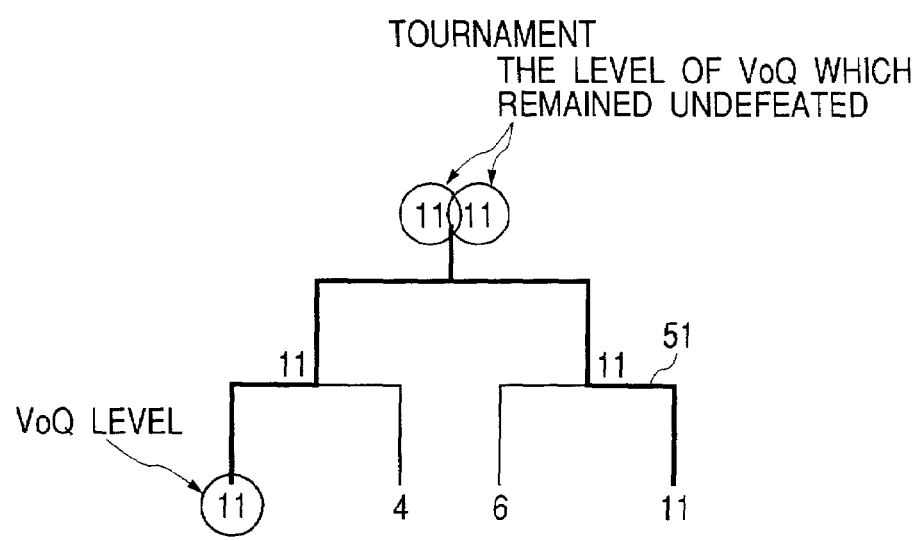
FIG. 7 is a diagram illustrating a concept of a VoQ level matrix of the present invention.
FIG. 8 is a diagram illustrating concept of a tournament of the present invention.

FIG. 7 illustrates a condition for all VoQs to which requests have been made as of arbitrary points of time. The columns of the matrix express an output line number 131, and the rows thereof express an input line number 132. For example, in the case where an input line number is 1 and an output line number is 1, the level, which is assigned to VoQ 11-1-1 of an input buffer 10-1 of FIG. 1, is stored. Further, a "O" 133 of the matrix has the same VoQ level and a level smaller than "O" is assigned to an empty portion.

In this example, giving grant to a VoQ having an output line number 4 in an input line number 2 and a VoQ having an output line number 2 in an input line number 4 obtain the best combination of inputs and outputs. In order to give grant to a VoQ efficiently all the time, a tournament for each of the inputs and a tournament for each of the outputs are performed.

FIG. 8 shows a concept of tournament processing. In FIG. 8, numerals represent the level of a VoQ which is a member of the same input line number or output line number. In FIG. 8, where there are two VoQs having the same levels, it is made not preferable for either one to win, but for all VoQs having the same levels to win. This is to give grant efficiently as shown in FIG. 7.

This tournament processing is performed for each of the input line directions and for each of the output line directions in every input line tournament processor 122-1 and every output line tournament processor 122-2, and then a VoQ is selected, which has the highest VoQ level (the request for transmitting is the highest among their line numbers) among them.

As a result of the tournament, a win/defeat combination 141 in FIG. 9 is capable of being considered for an input line direction and an output line direction. The level reassignment part 124 evaluates information of each VoQ level by reducing to four levels, 0 to 3, according to a level reassignment table 61, an example of which is shown in FIG. 10.

VoQs which have been reevaluated into four levels, 0 to 3, are picked up sequentially from VoQs of the level 3 in a selector 125 of a VoQ having the same level. Grant is given to a VoQ which has been picked up herein by a Round Robin selection in a grant assignment part 126.

Since it is not possible to give grant in the same arbitration period from both a VoQ to which grant is given and a VoQ which is a member of the same input line number or the same output line number, grant is taken away in a grant deprival part 127.

Information of a VoQ, the grant of which has been deprived, is communicated to all VoQ level collector 121 by way of a signal line 123. From this information, the tournament is performed once more among VoQs, the grant of which has not been deprived at all, and then the levels thereof are reevaluated. Then, in the same way as the aforementioned processing, a VoQ having level 3 is picked up by way of a same level VoQ selector 125, and then grant is given to the V0Q by a grant assignment part through the Round Robin selection. By repeating such a repetitive operation, it is possible to create the best combination of input line and output line.

Since it is not possible to give grant at the same time in the same arbitration period from a VoQs that are members of the same input line number or the same output line number as VoQs having grant in the aforementioned process, the grant deprival part 127 deprives grant from the VoQs. Information of a VoQ, the grant of which has been deprived, is communicated to the same level VoQ selector 125 by way of a signal line 129. The same level V0Q selector 125 picks up a VoQ having level 2 still having a grant and then gives a grant by the grant assignment part through the Round Robin selection.

Then, by way of the same process as giving a grant to a VoQ having a level 2, grant is given to a VoQ having a level 1. Grant is also given to a VoQ with the level 0 having a grant to be transmitted next.

Grant information is changed to ARB-ACK information by an ARB-ACK generator 128, and then it is transmitted to the BA generator 404 of the VoQ controller 12 by way of the signal line 15. The BA generator 404 transmits the segment-transmitting signal 413 to the VoQ, according to the ARB-ACK information. At the same time, VoQ information for sending the segment is communicated to the queue length manager 405 and the output data interval manager 406. The queue length manager 405 decreases the number of transmitted segments from the value of the queue length counter 410, which manages the number of segments of the VoQ to which the grant has been given. In the output data interval manager 406, the value of the sending out interval counter 411, which manages the output data interval of the VoQ to which the grant has been given, is reset.

Figure 11:
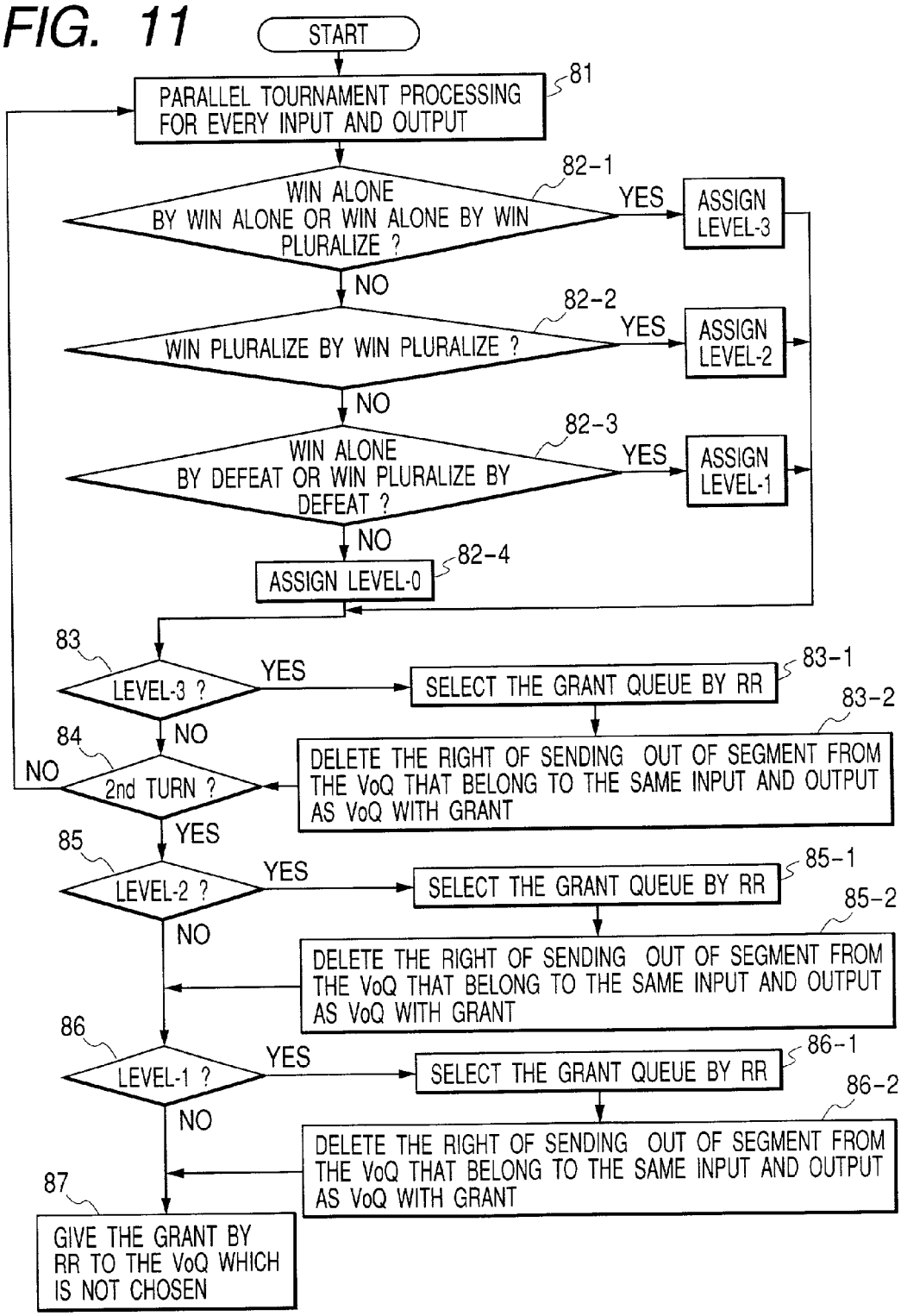
FIG. 11 is a flowchart illustrating an algorithm which the arbiter 14 of FIG. 1. performs.

FIG. 11 is a flowchart of a sequential process performed by the aforementioned arbiter 14. A tournament is performed for the VoQ levels which have been collected from each of the input buffers with respect to the input and the output (S81). The VoQ levels thereof are reevaluated using the levels of 3 to 0 in order of highly requested output data for each VoQ (S82-1 to -4). First of all, VoQs of the level 3 are picked up by way of the same level VoQ selector 125 (S83). Grant is given to them through Round Robin selection (S83-1) (it may be considered to adopt 2DRR (Namoru TAKAHASHI, et al., "Improvement of Packet-Priority-considered-Packet-Switch having Input Queue corresponding to each Output Port," SHINGAKUGIHOU SSE97-13) and the like, which has a pointer in order to maintain the state of being equal as this Round Robin selection). Since it is not possible to transmit the segment at the same time in the same arbitration period from the VoQ for the same input and the same output as the VoQ to which a grant has been given, a grant of the VoQ is deprived (S83-2).

In the present embodiment, in order to improve the efficiency of the arbiter, not to give a grant to VoQ having level 2, but the level of VoQ, to which grant is not given, is back to the level of 0 to 15 before reevaluating, the tournament is performed once more, and then reevaluation of the level (S84) is performed. The more this process is repeated, the more the combination of the queues selected by arbitration are closed to the most suitable one.

As a result of reevaluating, a grant is given to a VoQ having level 3 (S83-1). Grant of a V0Q, which has the same combination of input lines and output lines as the V0Q obtaining a grant, is cancelled (S83-2).

Subsequently, a VoQ having the level 2 is picked up (S85), grant is given (S85-1), and then the grant of a VoQ which has the same combination of input lines and output lines as the V0Q to which grant has been given is canceled (S85-2).

Subsequently, a VoQ having a level 1 is picked up (S86), grant is given (S86-1), and then grant of VoQ which has the same combination of input lines and output lines as the VoQ to which grant has been given is canceled (S86-2).

At last, if there is a VoQ having a grant at the level 0, grant is given by way of the Round Robin selection (S87). In this way, the process is ended to give a grant to the combination of all of the inputs and the outputs, and then the process of arbitration is finished.

Figure 12:
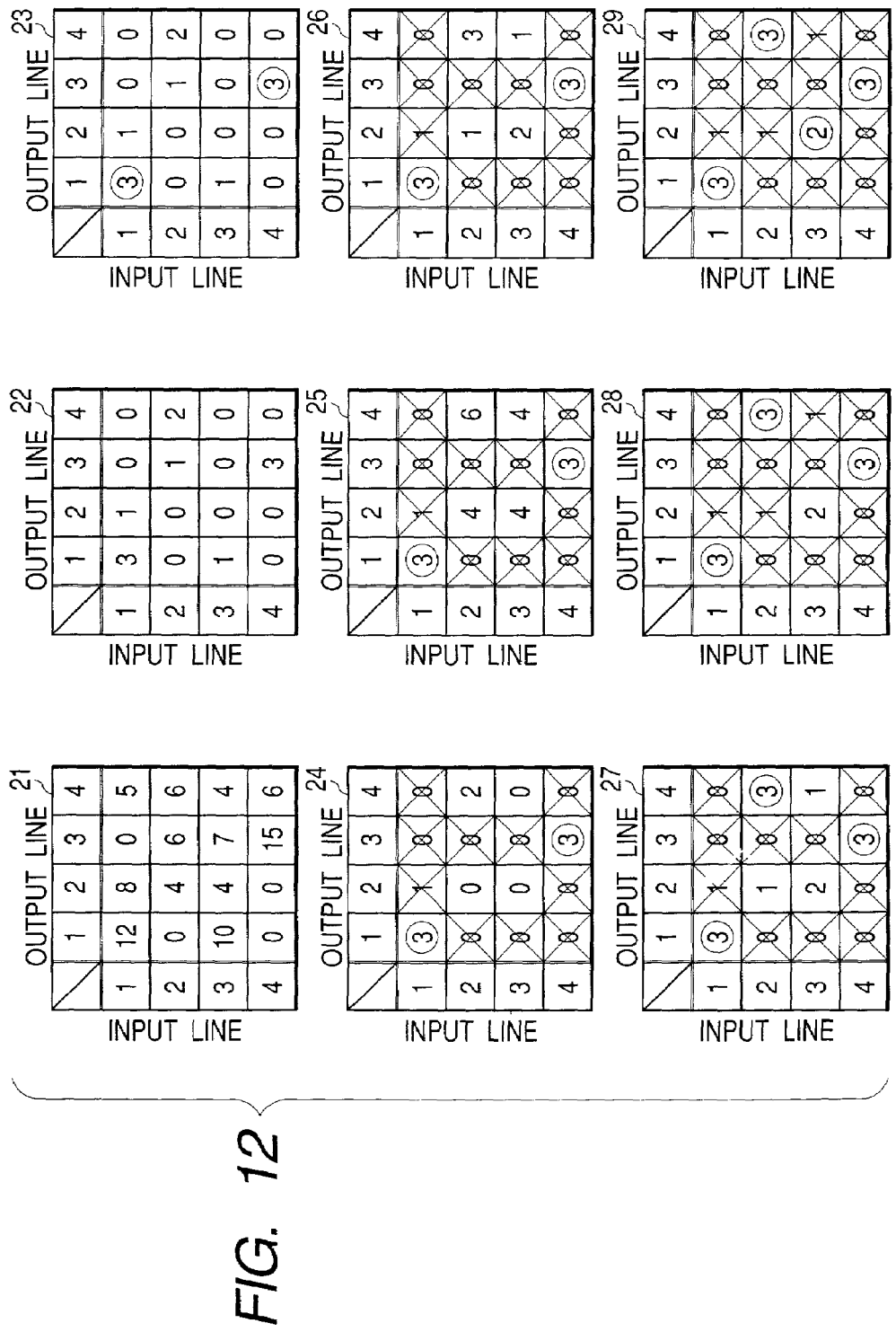
FIG. 12 is a diagram which illustrates processing of the arbiter 14 of FIG. 1.

FIG. 12 shows the results of processing in accordance with the flowchart of FIG. 11. This figure indicates arbitration of the 4×4 switch. It is possible to express the VoQ level, which have been collected in all VoQ levels collectors 121, visually in way of a matrix 21. The rows of the matrix indicate the input line number, and the columns indicate the output line number. This matrix shows that, for example, in the matrix 21, the VoQ level for the input line number 3 and the output line number 1 is 10.

The tournament of FIG. 8 is performed for each of the input lines and the output lines, and, thereafter, the aforementioned reevaluation is performed in FIG. 10. The matrix 22 indicates the results thereof.

The matrix 23 shows that a VoQ having level 3 has been selected from the matrix 22 and grant has been given thereto by way of the Round Robin selection. Since grant cannot be given to a VoQ which has the same input line number or output line number as a VoQ to which grant has been given at the same arbitration period, grant is deprived therefrom. The symbol "x" of the matrix 24 indicates that grant has been deprived.

Next, The level of a VoQ to which grant has not yet been given is back to the level of a VoQ which has been created in the ARB-REQ generator. A matrix 25 indicates the matrix which has already been converted. Once more, the tournament and reevaluation of the levels are performed.

A matrix 26 indicates the result thereof. In the matrix 26, grant is given to VoQ having level 3. At this point, grant is given to VoQ having the input line number 2 and the output input number 4.

A matrix 27 indicates that grant has been given thereto. Grant is deprived from a VoQ which has the same input line number and the output line number as VoQ to which a grant has been given.

A matrix 28 indicates that a grant has been deprived therefrom. Next, grant is given to a VoQ having level 2.

A matrix 29 indicates that grant has been given thereto.

In the case explained with reference to FIG. 6, since grant has been given to all of the combinations of inputs and outputs in accordance with the aforementioned processes, the series of arbitrations has terminated. For the case other than that, there may be a case where a process of giving a grant to a VoQ having a level 1 and a level 0 is required. In such a case, grant is given in accordance with the flowchart of FIG. 11.

Figure 13:
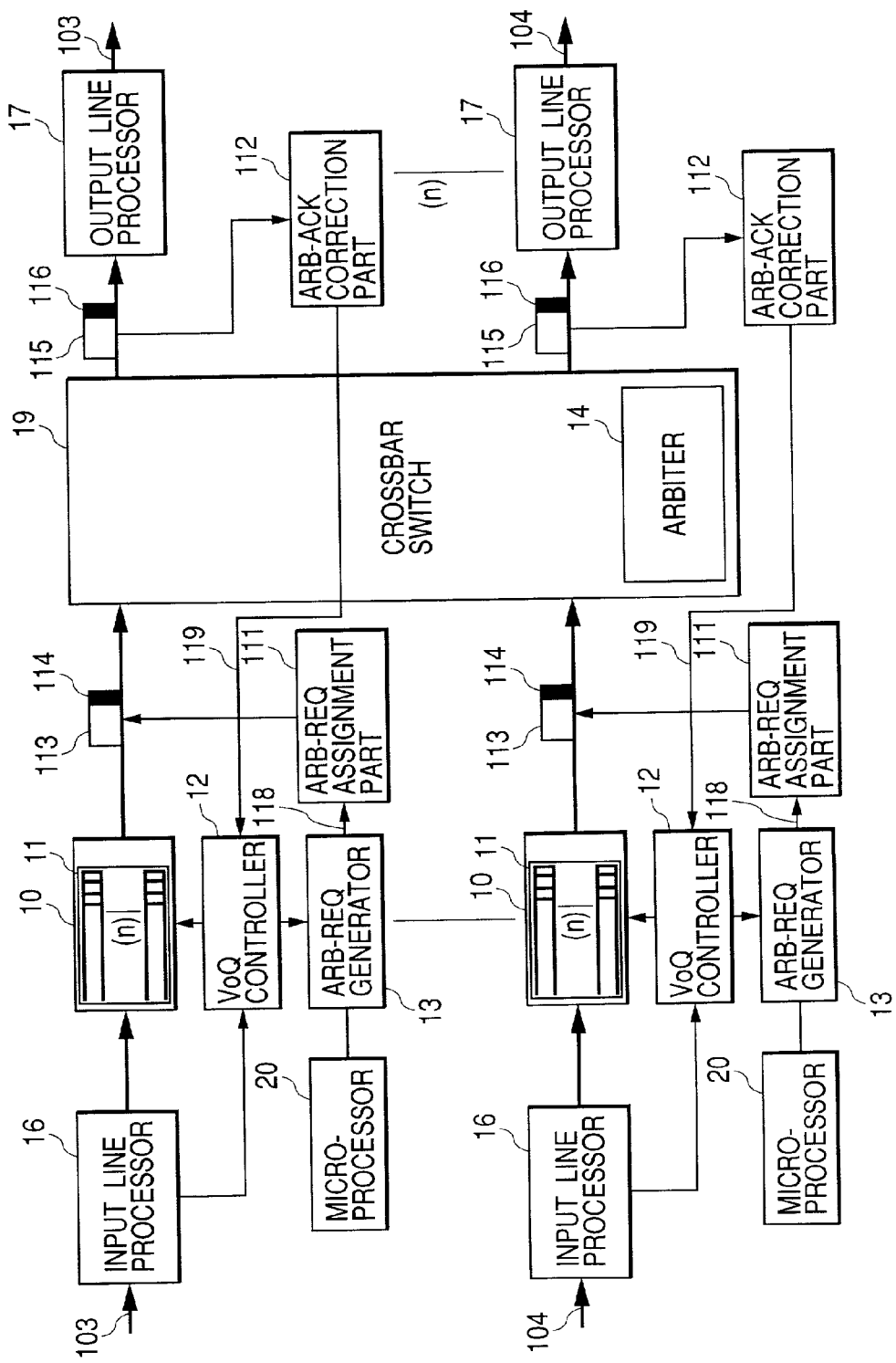
FIG. 13 is a block diagram of the overall structure of another embodiment of a packet switching system of the present invention.

FIG. 13 shows another embodiment of the packet switching system of the present invention. In this embodiment, by giving ARB-REQ information to a header portion of the segment without using another line, it is transmitted to an arbiter via an in-channel.

The differences between this embodiment and the packet switching system of FIG. 1 are that ARB-REQ information is first transmitted to an ARB-REQ assignment part 111 by way of a signal line 118 and then to the arbiter 14 by giving ARB-REQ information 114 to the header portion of a segment 113, and that the arbiter 14 is included inside the crossbar switch 19.

In the same way as the embodiment of FIG. 1, ARB-REQ information is collected in the arbiter 14, and then it is decided to which VoQ to give the grant from ARB-REQ information. Then, grant information is assigned to a header 116 of a switched segment 115 as ARB-ACK from the arbiter by way of the signal line 129. Grant information is collected in an ARB-ACK collection part 112, and then it is transmitted to the VoQ controller 12 byway of a signal line 119. The VoQ controller 12 instructs an input buffer from which VoQ to transmit the segment.

The advantageous point of this method is that it is possible to simplify the structure of the hardware, since the number of signal lines can be decreased, because it is not required to prepare the signal line for the arbiter.

Figure 14:
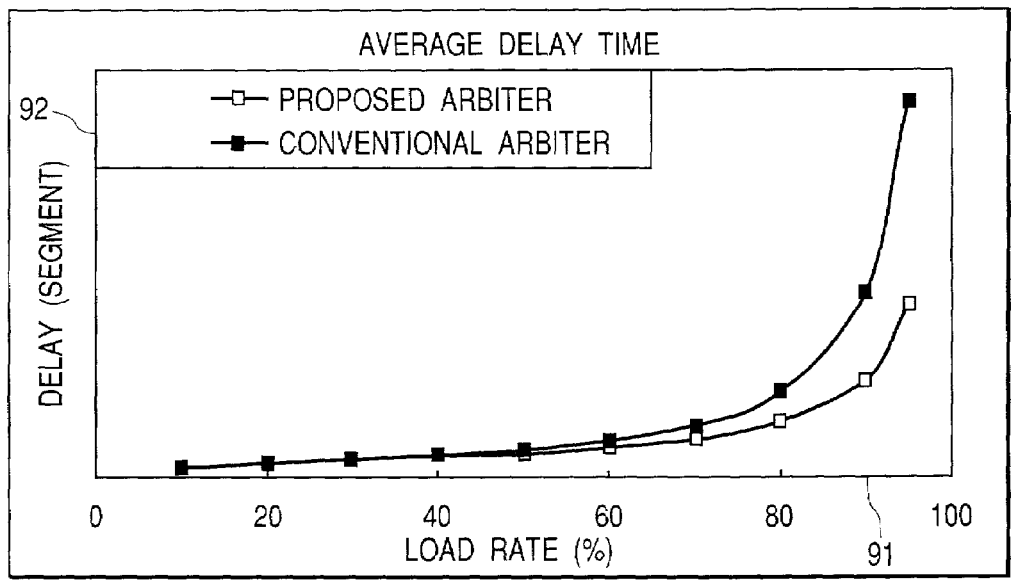
FIG. 14 is a graph indicating 99% delay of the conventional arbiter compared to an arbiter of the present invention.
Figure 15:
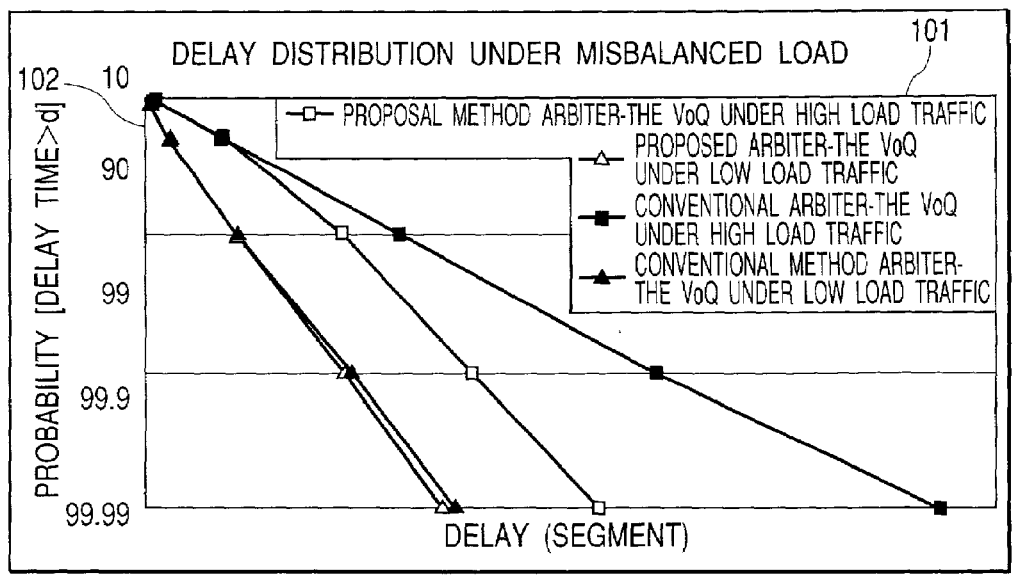
FIG. 15 is a graph of indicating queue length distribution of the conventional arbiter and the arbiter of the present invention when an unbalanced load is given.
Figure 16:
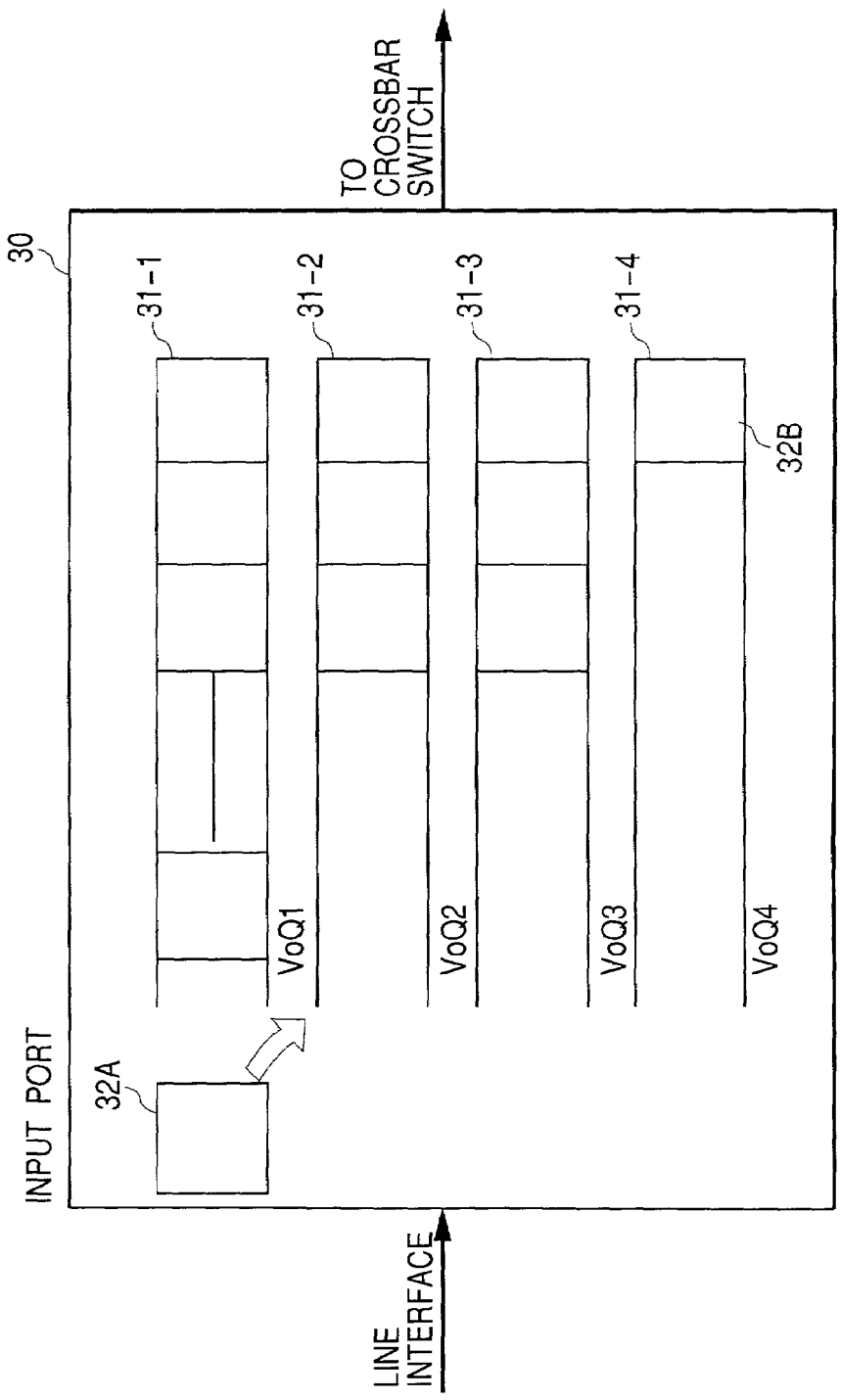
FIG. 16 is a diagram illustrating a concept of overflow of a VoQ to which high load traffic is applied and starvation of a VoQ to which low load traffic is applied.

FIGS. 14 and 15 show results of the simulation of a queue information management arbiter of the present invention and an arbitration method (referring to Koji WAKAYAMA, et al., "A Study of structuring a Large Capacity Packet Switching Systems," SHINGAKUGIHOU 1N98-160) for performing the Round Robin selection by judging the presence of the segment of a VoQ under the same condition. It is supposed that the condition of the simulation is a 4×4 input output crossbar switch having four input lines and four output lines.

FIG. 14 shows a distribution graph of an average delay time of the conventional arbiter and the proposed arbiter of the present invention at the time of having uniform traffic. The vertical axis 92 denotes Delay (Segment), and the horizontal axis 91 denotes Load Rate (%). The higher the load of a line is, the bigger the volume of the delay of the conventional arbiter is. However, it is possible for the proposed arbiter to suppress the delay time from increasing.

Even for uniform traffic, if the load of the line becomes higher, the traffic condition tends to be unbalanced. Therefore, the proposed arbiter, which takes both the output data interval and the queue length of a VoQ as parameters, can suppress the delay time better than the conventional arbiter, which considers only whether the segment exists as a parameter.

FIG. 15 shows the results of the simulation of the delay distribution of a VoQ having a low load traffic and a VoQ having a high load traffic when traffic having a load higher than others is given to one input line among four input lines. The vertical axis 102 denotes Probability (Delay time>d), and the horizontal axis 101 denotes Delay (segment).

Quadrilateral plots denote the delay distribution of the input port having traffic of the higher load, and triangular plots denotes the delay distribution of the input port having traffic of the lower load.

As shown from the delay distribution of a VoQ having traffic of the higher load, the proposed arbiter suppresses the delay time better than the conventional type arbiter. The length of the queue of a VoQ having the higher traffic is longer than that of the other VoQs. The proposed way of performing arbitration by taking the length of the queue as a parameter tends to give much consideration to a VoQ having a long queue length. This can suppress the delay time of a VoQ having traffic of a higher load.

On the other hand, though an impact is given to a VoQ having traffic of a low load by said effect, the switching system of the present invention can suppress the effect on a VoQ having a low load traffic because it takes the output data interval as a parameter.

Since the length of the queue is managed, it is possible to perform highly effective switching even when unbalanced loads are applied to the switch. It is possible to suppress the delay time of a VoQ effectively, to which traffic of a high load is applied. Further, it is possible to transmit a segment without giving an effect to a VoQ to which traffic of a low load is applied.

Even for a VoQ to which traffic of a low load is applied, it is possible for a VoQ level to take the maximum level when the time predetermined by a user arrives. Thus, it becomes easy to remain undefeated in the input direction and the output direction for the tournament of next processing, and thus it becomes possible to attain the maximum level when the level is reevaluated. Therefore, it becomes easy for its VoQ to obtain grant of the segment. Therefore, it becomes possible to prevent starvation of a VoQ to which traffic of a low load is applied.

By employing the present invention, it is possible to provide an arbiter that is capable of managing any of balanced loads or unbalanced loads.

We claim:

1. A packet switching system, comprising:
    a plurality of input line processors;
    a plurality of output line processors;
    a plurality of input buffers including a plurality of queue buffers, being provided corresponding to the output line processors, and being connected to the input line processors;
    a crossbar switch being connected to the input buffers and the output line processors;
    an arbiter to arbitrate for assigning grant of transmitting a packet to said crossbar switch, to any of queue buffers to the queue buffers; and
    means to determine priority as a parameter between an interval of time for a packet to be transmitted to the crossbar switch from said queue buffer and a queue length of said queue buffer, both are calculated for each queue buffer of said queue buffers, to thereby select a queue buffer among all queue buffers in the input buffers and give the selected queue the grant for transmitting a packet to said crossbar switch,
    wherein said arbiter performs arbitration according to said priority determined on all queue buffers of the input buffers, and
    wherein the arbitration is performed based on a transmit priority level calculated by the equation of $L=(1/ln(e \times (M-a*t)/(b*s))) \times 15$, where L is the priority level, M is the time out, t is output data interval, s is the number of segments at present time, a is output data coefficient, and b is queue length coefficient.

2. A packet switching system as set forth in claim 1, further comprising:
    output data interval measuring means for measuring an interval of time for a packet to be transmitted to the crossbar switch from said queue buffer, and
    queue length measuring means for measuring a length of the queue buffer, both measuring each queue buffer of all the queue buffers.

3. A packet processing unit as set forth in claim 1, wherein the arbitration is performed by taking as a parameter the queue length prior to the time interval so as to prevent packets from overflowing from each of the queue buffers.

4. A packet processing unit as set forth in claim 1, wherein the arbitration is performed by taking as a parameter the time interval prior to the queue length, so as to shorten a time for a packet to exist in each of the queue buffers.

* * * * *